Dec. 19, 1950     J. L. YOUNGHUSBAND     2,534,495

REARVIEW MIRROR

Filed Aug. 26, 1949

Inventor.
James L. Younghusband
by M. Knight and Gustoek
Attorneys

Patented Dec. 19, 1950

2,534,495

UNITED STATES PATENT OFFICE 2,534,495

REARVIEW MIRROR

James L. Younghusband, Chicago, Ill.

Application August 26, 1949, Serial No. 112,525

1 Claim. (Cl. 88—98)

My invention relates to a rear view mirror for automobiles and other vehicles.

A driver of an automobile or other vehicle desires a certain adjustment of his rear view mirror. It is often a delicate adjustment, taking some little time and care to obtain the proper desired position. Once this is obtained, the driver does not want to have it changed. Frequently, however, in stopping, gas station attendants, garage men, parking lot jockeys and others will change the adjustment of the mirror. This necessitates another adjustment which takes time and care. Often the adjustment is only partly off and the driver proceeds with limited efficiency.

Among the objects of my invention is to solve these problems by providing a mirror so constructed that once it has been adjusted to desired position, it will return to that position automatically and without further adjustment. My mirror will also prevent unauthorized and undesired readjustment by others.

My invention also contemplates such other objects, advantages and capabilities as will later more fully appear and which are inherently possessed by my invention.

While I have shown in the accompanying drawings, a preferred form of my invention, yet I wish it understood that the same is susceptible of modification and change without departing from the spirit of my invention.

Figure 1:
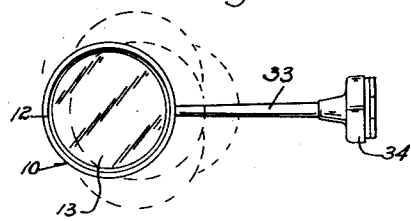
Figure 3:
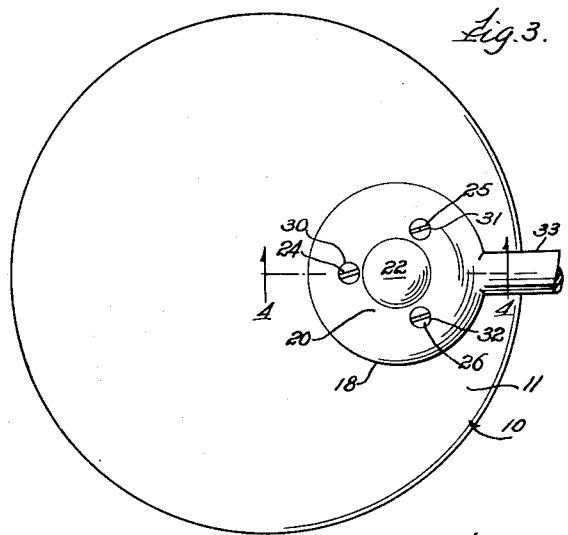
Figure 2:
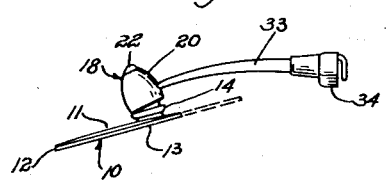
Figure 4:
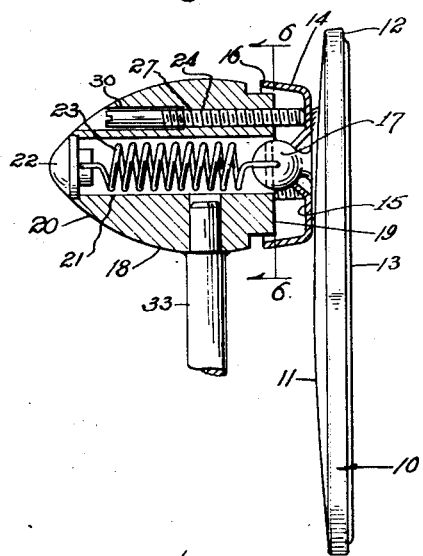
Figure 5:
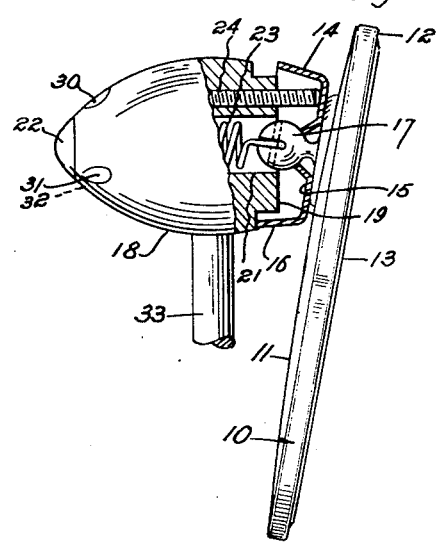
Figure 6:
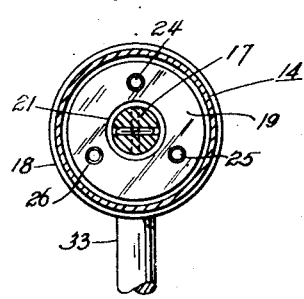

Referring to the drawings, Fig. 1 is a front elevational view of my rear view mirror; Fig. 2 is a top plan view of the same; Fig. 3 is an enlarged sectional view of my mirror; Fig. 4 is an enlarged longitudinal sectional view on line 4—4 of Fig. 3; Fig. 5 is an enlarged detailed sectional view showing the angle adjustment and Fig. 6 is an enlarged detailed sectional view on line 6—6 of Fig. 4.

The embodiment selected to illustrate my invention comprises a casing 10 having a back portion 11 and a rim 12 within which is mounted a mirror 13. A cup 14 has a bottom portion 15 and marginal side portions 16. Ball shaped member 17 attached to back portion 11 extends through bottom portion 15 and rotatably attaches cup 14 to casing 13.

A housing 18 has an inner end 19 and tapers bullet shaped to outer end 20. At the rear end of hollow central portion 21 of housing 18 is end plug 22 to which is attached the outer end of coiled spring 23. The inner end of coiled spring 23 is attached to ball 17.

A plurality of radially spaced screws, shown for illustration as three, namely 24, 25 and 26 extend through respective screw threaded openings in housing 18. Screw threaded opening 27 is shown in Fig. 4.

The side walls of housing 18 are reduced adjacent the inner end of housing 18 and extend within the side walls 16 of cup 14.

The screws 24, 25 and 26 are adapted to extend beyond the inner end 19 of housing 18 to bear against the inside of bottom 15 of cup 14 to obtain the desired permanent adjusted position of the mirror 13.

The heads of screws 24, 25 and 26 may be reached respectively through deepened openings 30, 31 and 32 in the outer side walls of housing 18.

In operation, once the mirror has been adjusted by a screw driver on screws 24, 25 and 26 to a desired adjusted position, mirror 13 when moved, will immediately return upon release to the desired adjusted position.

A rod 33 attached at its inner end to said housing 18 has a clamp 34 at its outer end for engaging the rim of a car for attachment thereto.

Having thus described my invention, I claim:

A rear view mirror for vehicles adjustable to an unlimited number of positions and automatically returnable to the desired position, comprising a casing, a mirror mounted in said casing, a ball-shaped member attached to the rear of said casing, a cup having an opening, said ball-shaped member extending through the opening of said cup and pivotally attaching said casing to said cup, a housing having its upper end extending within said cup, said housing tapering bullet-shaped to a rear end, a coiled spring positioned within said housing and having its lower end attached to said housing and its upper end attached to said ball-shaped member, a plurality of spaced screws screw threaded within said housing, the lower ends of said screws extending short of the housing and positioned within the said housing, said housing having a plurality of spaced deepened openings extending from the exterior of said housing to the lower ends of said screws, the lower ends of said screws notched to receive and be moved by the head of a screw driver so that the upper ends of said screws extend upwardly beyond said housing to bear against said cup to tilt said casing and said mirror to desired position, said spring adapted when said mirror is moved to other than the desired position to return said mirror when released to the desired position, and a rod attached to said housing and having means for attachment to a vehicle.

JAMES L. YOUNGHUSBAND.

REFERENCES CITED

The following references are of record in the file of this patent:

UNITED STATES PATENTS

| Number | Name | Date |
|---|---|---|
| 1,364,268 | Fletcher | Jan. 4, 1927 |
| 2,456,362 | Aves | Dec. 14, 1948 |
| 2,471,954 | Harvey | May 31, 1949 |
| 2,504,386 | Brady et al. | Apr. 18, 1950 |